July 9, 1946. J. D. PIERSON 2,403,754
SEAPLANE SPONSON
Filed Feb. 9, 1944 2 Sheets-Sheet 1

INVENTOR.
JOHN D. PIERSON
BY
*George Douglas Jones*
ATTORNEY

July 9, 1946.  J. D. PIERSON  2,403,754
SEAPLANE SPONSON
Filed Feb. 9, 1944  2 Sheets-Sheet 2
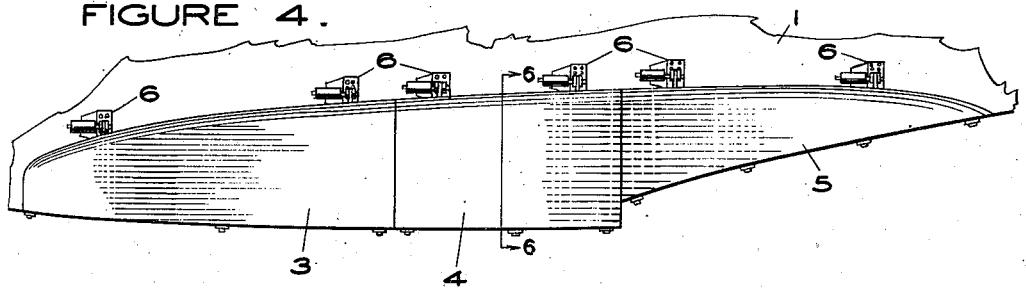
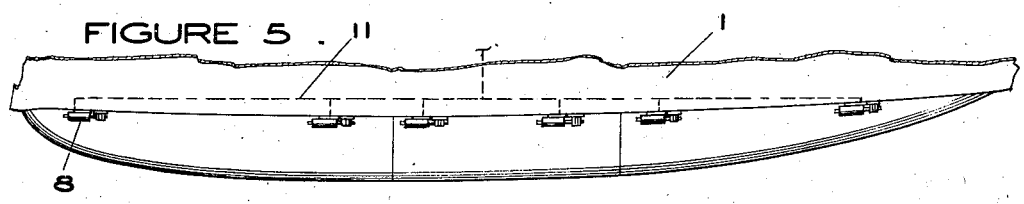
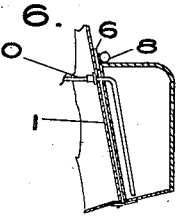
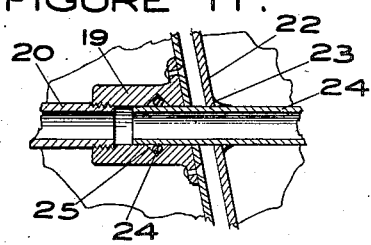
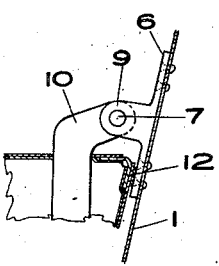
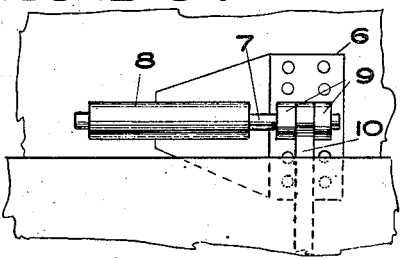
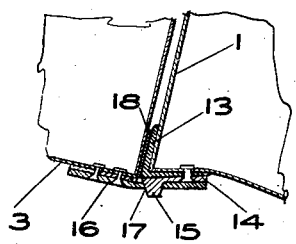
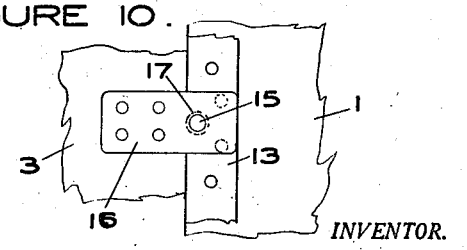
INVENTOR.
JOHN D. PIERSON
BY
George Douglas Jones
ATTORNEY Patented July 9, 1946

2,403,754

UNITED STATES PATENT OFFICE 2,403,754

SEAPLANE SPONSON

John D. Pierson, Overlea, Md., assignor to The Glenn L. Martin Company, Middle River, Md., a corporation of Maryland Application February 9, 1944, Serial No. 521,608

5 Claims. (Cl. 244—135)

This invention relates to a method and means for increasing the range of a seaplane and assisting the take-off under heavy loads by means of droppable sponsons mounted exteriorly of the hull, along the chine that increase the fuel storage capacity and afford greater planing area.

The inherent structure and design of any aircraft necessarily determines take-off characteristics, and the fuel carrying capacity designed for the craft, determines maximum range. Aircraft designers are continually on the lookout for any device or expedients which may be employed in connection with a finished design to improve either performance, take-off or range that do not amount to a major change in structure or which do not inhibit existing desirable performance characteristics of the airplane.

The take-off characteristics of seaplanes are usually quite critical and overloading the plane, such as increased fuel loads, to extend the range of the craft would bring about undesirable changes in the hydrodynamic characteristics of the craft at take-off.

By this invention a means is provided whereby the range of a seaplane can be extended without sacrifice of any of the desirable performance characteristics.

A further object of the invention is the provision of structure to increase the range which also improves the take-off characteristics of the aircraft.

Another object of the invention is the provision of means for storing additional fuel exteriorly of the aircraft which does not interfere with performance characteristics and further may be jettisoned to increase the range of the craft when no longer needed.

Further and other objects will become apparent from the description of the accompanying drawings which form a part of this disclosure and in which like numerals refer to like parts.

In the drawings:

Figure 4 is a fragmentary view of the side of a seaplane hull showing the droppable sponson.

Figure 5 is a fragmentary view in principle of the structure shown in Figure 4.

Figure 6 is a fragmentary section through the hull and sponson.

Figures 7 and 8 show the attachment of the top of the sponson to the hull.

Figures 9 and 10 show the attachment of the bottom of the sponson to the hull.

Figure 11 is a fragmentary view in section showing the detachable fuel line.

Figure 1:
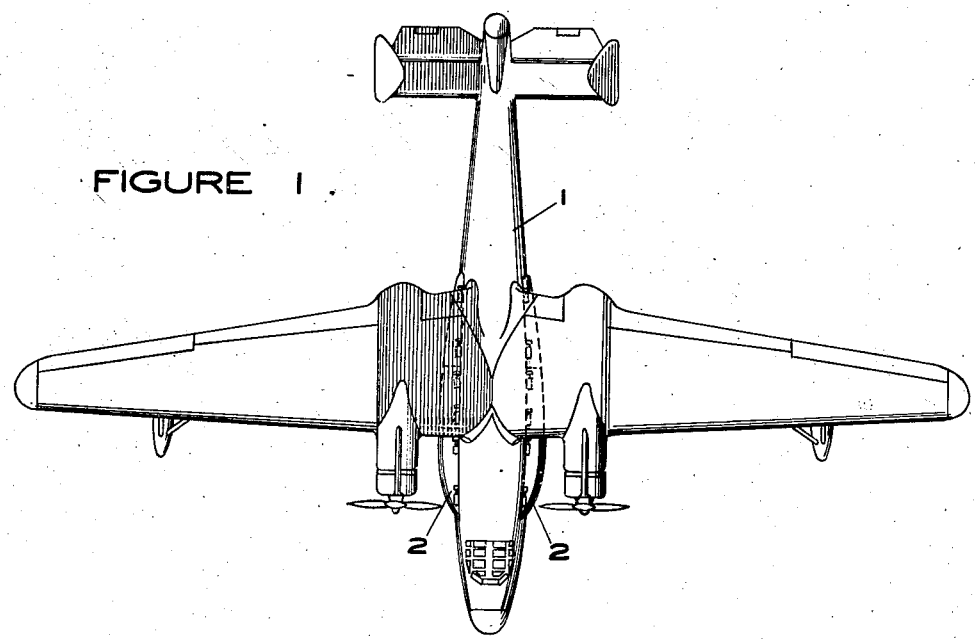
Figure 1 shows a plan view of the invention applied to a seaplane.
Figure 2:
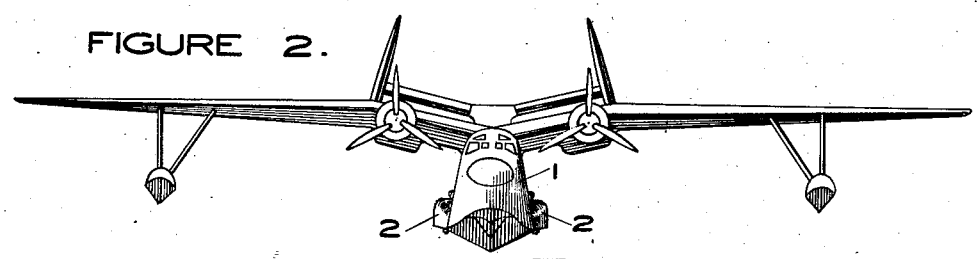
Figure 2 is a front view of the seaplane incorporating the invention.
Figure 3:
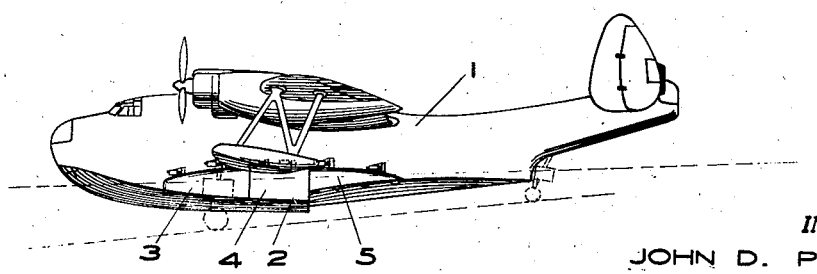
Figure 3 is a side view of the seaplane showing the location of the invention.

The seaplane illustrated in Figures 1, 2 and 3 is shown having a hull generally indicated as 1 to which the subject sponsons 2 are attached. It will be noted that in this application of the invention, the sponsons are so formed that they extend forward and aft of the wing and, in the particular application, form substantially a continuation of the bottom surface of the hull forward and aft of the first step.

Figures 3, 4 and 5 show the droppable sponsons in sections. Sections 3, 4 and 5 go to make up a complete sponson by having their ends contiguous. These sections are separately attached and detachable from the hull along the chine and the bottoms of these sections form a smooth continuation of the hull bottom, thereby increasing the planing area of the hull adjacent the step. Figures 4 and 5 show enlarged views of the sponsons. Each section of the sponson is secured to the hull by a fitting 6 which has a pin 7 retractable into a cylinder 8 by means of fluid pressure. This pin extends through eyelets 9 in bracket 6 which is attached to the hull, and an eyelet in member 10, attached to the tank. The fluid cylinders are all connected together by line 11, communicating with a source of fluid pressure, which may be either a part of the hydraulic system of the craft, or in the preferred form, an air bottle may be employed to quickly and simultaneously withdraw the pins so the sponson sections may be dropped all together.

Figures 7 and 8 show enlarged views of the details of the bracket and pin for attaching and detaching the sponson from the hull desired above. A pad 12 is provided between the sponsons and the hull to prevent abrasive action between the sponson and the hull.

Figures 9 and 10 are enlarged views showing the attaching bracket for supporting the bottom of the sponson on the bottom of the hull, at the chine strip 13. A bracket 14 is riveted on the chine having a tapered projection 15. To a sponson 3, a plate 16 is riveted having a hole 17 adapted to extend and fit over projections 15. A pad 18 is placed between the sponson and the chine strip to protect each from abrasion by the other.

The gasoline line 20 to withdraw gasoline from the sponsons, is shown in Figures 6 and 11. The latter figure shows an enlarged detail of the gasoline line and fitting connection between the sponson and the hull, with provision for a quick detachment of the line, when the sponson falls away from the side of the ship upon the withdrawal of the pins. A bracket 19 is shown secured to the hull. Pipe 20 is connected to this bracket and to the fuel pumps. Pipe 21 extends through the wall 22 of the sponson and is secured thereto by a weld or other means as indicated at 23. This pipe extends through a hole in the wall of the hull and into bracket 19. A sealing means is provided in the form of O-ring 24, of elastic resilient material, placed in a groove 25 to effect a fluidtight seal. It can readily be seen from an inspection of Figures 6 and 11, that when pins 7 are withdrawn from eyelets 9 and 10 the aerodynamic forces and the force of gravity will urge the tanks outwardly, withdrawing the pipe 21 from bracket 19 and downwardly to disengage plate 16 from projection 15, thus freeing the sponson from the attachment to the hull.

It has been found that on a flying boat, similar to that illustrated, the addition of such sponsons increases the range about 60% by providing additional fuel storage space. The increased planing area adjacent the step compensates for the additional load of gasoline on take-off so that the take-off characteristics are about the same as without the sponsons and additional load. In other words, at take-off the sponsons carrying the gasoline by their form, compensate for the additional load caused by the gasoline. The fuel will be first drawn from the auxiliary tanks in the sponsons and during flight. The sponsons affect the aerodynamic characteristics of the airplane so that about 2% reduction in top speed results. The effect on cruising speed is less so that it is practically inconsiderable. When the gasoline has been used from all the sponson tanks, by means of fluid pressure connected to lines 11, all the sponson tanks may be dropped simultaneously and the plane continue on its trip with top performance having the advantage of normal take-off and a 60% increase in its range.

It should be noted that the sponsons may be made relatively inexpensively compared with the very desirable result obtained and the adaptation of the ship for the connection of droppable tanks of the character described does not affect the landing and take-off of the ship in normal operations without such tanks.

The number of tanks is, of course, optional. In the preferred embodiment herein described, the sponsons are shown in three sections for convenience of handling and attachment. Since all seaplanes must have beaching gears of some sort, in the preferred form of the invention, a forward section of the sponson is shown of a longitudinal extent sufficient to span the area on the hull where the beaching gear would normally be attached. The beaching gear location is shown in dotted lines in Figure 3. The portions of the sponson, except for this section, can be installed while the seaplane is on shore on the beaching gear, and the forward portion of the sponson can be attached after the beaching gear has been removed when the seaplane is afloat. Due to the difficulty of handling seaplanes in rough water, the advantages of attaching the major portions of such sponsons on shore and filling them with gasoline on shore, should be obvious.

It is to be understood that certain changes, alterations, modifications and substitutions can be made without departing from the spirit and scope of the appended claims.

I claim as my invention:

1. In combination with a stepped seaplane hull, sponsons adapted to carry auxiliary fuel comprising tanks extending along the chine on each side of the hull forward and aft of the step, the bottom of the sponsons forming substantially a continuation of the bottom of the hull, said sponsons comprising a plurality of separate tanks placed along the chine with their ends contiguous, whereby a substantially unitary sponson is formed, said sections being separately removable for service and repair, means to detachably secure said sponsons to said hull, whereby said sponsons may be dropped after performing their dual function of increasing the planing area and affording storage space for auxiliary fuel.

2. In combination with a stepped seaplane hull, sponsons adapted to carry auxiliary fuel comprising tanks extending along the chine on each side of the hull forward and aft of the step, the bottom of the sponsons forming substantially a continuation of the bottom of the hull, said sponsons comprising a plurality of separate tanks placed with their ends contiguous along the chine whereby a substantially unitary sponson is formed, a detachable telescopic, sealed fitting connecting the gasoline line with the interior of each of said tanks, said sections being separately removable for service and repair, means for detachably securing said sponsons to said hull, whereby said sponsons may be dropped after performing their dual function of increasing the planing area and affording storage space for auxiliary fuel.

3. In combination with a stepped seaplane hull, sponsons adapted to carry auxiliary fuel comprising tanks extending along the chine on each side of the hull forward and aft of the step, the bottom of the sponsons forming substantially a continuation of the hull, means to detachably secure said sponsons on said hull, whereby said sponsons may be dropped after performing their dual function of increasing the planing area and affording storage space for auxiliary fuel, a readily detachable sealing means connecting a gasoline line with the delivery line from said tanks, and means to simultaneously detach all tanks from said hull.

4. In combination with a stepped seaplane hull, sponsons adapted to carry auxiliary fuel comprising tanks extending along the chine on each side of the hull forward and aft of the step, the bottom of the sponsons forming substantially a continuation of the bottom of the hull, said sponsons comprising a plurality of sponson tanks placed along the chine with their ends contiguous whereby a unitary sponson is formed, readily detachable means securing the bottom edge of the tank to said chine, means to detachably secure the top of said sponson tanks to said hull, said last mentioned means being interconnected for simultaneous operation whereby said sponsons may be dropped after performing their dual function of increasing the planing area and affording storage space for auxiliary fuel.

5. In combination with a seaplane hull, sponsons adapted to carry auxiliary fuel comprising tanks extending along the chine on each side of the hull, the bottom of the sponsons forming substantially a continuation of the bottom of the hull, said sponsons comprising a plurality of sponson tanks placed along the chine with their ends contiguous whereby a unitary sponson is formed, readily detachable means securing the bottom edge of the tank to said chine, means to detachably secure the top of said sponson tanks to said hull, said last mentioned means being interconnected for simultaneous operation whereby said sponsons may be dropped after performing their dual function of increasing the planing area and affording storage space for auxiliary fuel.

JOHN D. PIERSON.